United States Patent
Tiku et al.

(10) Patent No.: US 10,149,156 B1
(45) Date of Patent: Dec. 4, 2018

(54) TRUSTED CALLER IDENTIFICATION

(71) Applicant: AMAZON TECHNOLOGIES, INC., Seattle, WA (US)

(72) Inventors: Nandit Tiku, Seattle, WA (US); Derek William Bolt, Seattle, WA (US); Marcel Andrew Levy, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 347 days.

(21) Appl. No.: 14/975,301

(22) Filed: Dec. 18, 2015

(51) Int. Cl.
*H04W 12/06* (2009.01)
*H04W 4/14* (2009.01)
*H04M 3/42* (2006.01)
*H04L 9/30* (2006.01)

(52) U.S. Cl.
CPC .............. *H04W 12/06* (2013.01); *H04L 9/30* (2013.01); *H04M 3/42059* (2013.01); *H04W 4/14* (2013.01); *H04L 2209/24* (2013.01)

(58) Field of Classification Search
CPC .......... H04W 12/06; H04W 4/14; H04L 9/30; H04L 2209/24; H04M 3/42059; H04M 3/42
See application file for complete search history.

(56) References Cited

U.S. PATENT DOCUMENTS

| | | | |
|---|---|---|---|
| 9,094,519 B1* | 7/2015 | Shuman | H04M 3/54 |
| 2012/0144198 A1* | 6/2012 | Har | H04L 63/0869 |
| | | | 713/170 |
| 2012/0262275 A1* | 10/2012 | Schultz | G06F 21/32 |
| | | | 340/5.83 |
| 2012/0314860 A1* | 12/2012 | Liu | H04L 63/0414 |
| | | | 380/247 |
| 2013/0046855 A1* | 2/2013 | Jiang | G06F 17/30899 |
| | | | 709/218 |
| 2013/0124285 A1* | 5/2013 | Pravetz | G06Q 10/00 |
| | | | 705/14.23 |
| 2014/0187203 A1* | 7/2014 | Bombacino | H04W 12/06 |
| | | | 455/411 |
| 2014/0233855 A1* | 8/2014 | Clarke | G06F 17/30247 |
| | | | 382/190 |

* cited by examiner

*Primary Examiner* — Ayoub Alata
(74) *Attorney, Agent, or Firm* — Lindauer Law, PLLC

(57) ABSTRACT

A trusted caller ID authority receives registration data from a first communication device. The first communication device is authenticated by the trusted caller ID authority using the registration data and an authentication object is provided to the first communication device. A second communication device receives a call and the authentication object from the first communication device. The second communication device sends a validation request to the trusted caller ID authority that includes the authentication object. Validation information associated with the first communication device is provided to the second communication device. The validation information includes registration and authentication status of the first communication device.

20 Claims, 7 Drawing Sheets

TRUSTED CALLER IDENTIFICATION

BACKGROUND

Caller identification data may provide information about the originator of a telephone call to a recipient. However, caller identification data may be "spoofed" or changed to present inaccurate information about the originator. This spoofing may hamper effective communications between the originator and the recipient.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
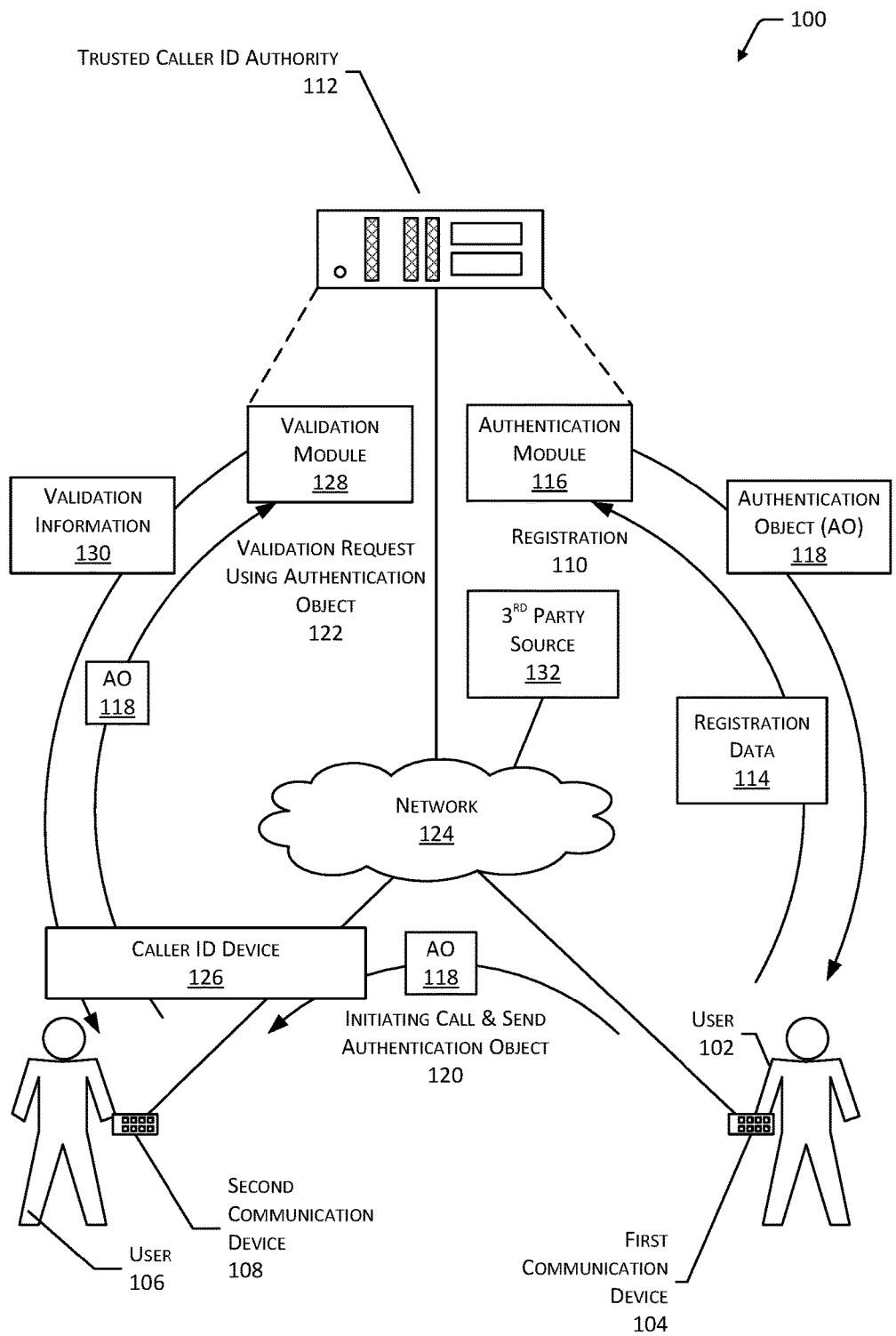
FIG. 1 illustrates a system for providing trusted caller identification (ID).

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

Caller ID, which is also referred to as calling line identification, calling number delivery, calling number identification, or calling line identification presentation, is a service that may be provided by a telecommunication carrier. Caller ID is available in analog and digital phone systems as well as most Voice over Internet Protocol (VoIP) applications. Caller ID is used to transmit a caller's number to the called party's telephone equipment during the ringing signal or when the call is being set up but before the call is answered. Where available, caller ID can also provide a caller ID name (CNAM) associated with the calling telephone number. The information made available to the called party may be displayed on a telephone's display, on a separately attached device, or personal computer, and so forth. Caller ID may be presented to a second communication device. A recipient receiving a call using the second communication device may use the caller ID information to select which incoming calls to answer. If the caller ID is a number the recipient does not recognize or is a number the recipient does not want to talk to, the recipient may ignore the call. In terms of privacy, the originator of the call may want to maintain their privacy and not provide caller ID. The recipient's phone will display "unknown" or "blocked" instead of the caller ID of the originator of the call.

Caller ID spoofing is the practice of causing the telephone network to indicate to the receiver of a call that the originator of the call is a device other than the true first communication device. For example, a caller ID display may display a phone number different from that associated with the telephone line from which the call originated. In some implementation, the caller ID data may be modified for legitimate purposes. For example, a company may wish to report the main number of the business in the caller ID information, rather than a telephone number of a particular direct inward dial (DID) extension, trunk number, and so forth. However, criminals may "spoof" or modify the caller ID to appear to be a legitimate entity, such as a bank or government agency, to collect personal information to attempt identity theft. At a minimum, caller ID spoofing causes annoyance to the receiver as well as the true owner of the phone number that is being fraudulently delivered to a recipient's telephone. However, caller ID spoofing may lead to the recipient trusting the originator of the call identified by the caller ID by divulging sensitive information, such as their credit card information, social security number and the like.

Described is a system to provide authenticated information about a first communication device to a second communication device. The authenticated information may improve communication by allowing a recipient to have confidence in the origin of a call. Authentication objects, such as authentication certificates or tokens, may provide to a second communication device trustworthy information about the identity of the first communication device.

A first communication device registers with a server acting as a trusted caller ID authority. The server verifies the identity of the first communication device requesting registration with the server. The server issues an authentication object to the first communication device. The authentication object may include a certificate, token, and the like. For example, the authentication object may include information indicative of the identity and public key of the first communication device that are signed using a digital certificate issued by the server.

During registration, the user may be assigned a trusted caller ID account. The user may link their trusted caller ID account with an account used by a social media service, or add a custom photograph or avatar for display on the second communication device. A photograph associated with a user of the first communication device may also be provided by the validation information from the server to the second communication device when validation of the first communication device is successful. By linking the user's trusted caller ID account to their social media server, a photograph from the social media server may be provided to the server for use as a caller ID indicator at the second communication device.

When a first communication device calls a second communication device, the authentication object is provided to the second communication device. The second communication device may then provide the authentication object to the server. The server attempts to validate the first communication device using the authentication object. The server then sends validation information to the second communication device. The second communication device may decide how to treat the first communication device based on the validation information received from the server.

A trusted caller ID application may execute on the communication devices. The trusted caller ID application may be used to register with the server, provide registration data, manage authentication objects, validate the authentication objects, and so forth. The authentication objects may expire after a threshold amount of time. For example, the public keys and private keys may expire after 12 months. The authentication objects may be renewed automatically or manually using the trusted caller ID application.

The registration data provided in a registration request by the first communication device to the server may include one or more of the following: a phone number, a service provider, a public key, a trusted token, a hardware identifier, a carrier account number, or other information associated with the device. The first communication device may also provide location data to the server. Hardware identifiers may include the International Mobile Station Equipment Identity (IMEI) or Media Access Control (MAC) address associated with the first communication device. The location data may be obtained from satellite radio navigation services, cell data networks, Wi-Fi® location lookup, and so forth. The server may use the location data of the first communication device to notify a second communication device when the first communication device makes calls from locations that do not correspond to a previously establish pattern. For example, if the call originates from a location that has not been recently visited by the first communication device or from a location that is farther than a threshold distance from the last known location of the first communication device, the server may issue a notification to the second communication device. The notification may provide a warning to the second communication device may not be associated with the caller ID presented at the second communication device.

In one implementation, the server uses the registration data to register the first communication device. To authenticate the registration data from the first communication device, the server may access identification data from a third party source. Third party sources may include identification information maintained by banks, payment processors, merchants, government institutions, credit agencies, telecommunication carriers, and so forth. The server may determine that at least a portion of the registration data corresponds to the identification data accessed from the third party source. If the correspondence exceeds a threshold, the registration data may be deemed suitable for the issuance of an authentication object to the first communication device. The first communication device may then receive the authentication object from the server. During initiation of a call, the first communication device sends the authentication object to the second communication device. The second communication device may then validate the authentication object.

In one implementation, the trusted caller ID application of the first communication device may authenticate the first communication device using standard Secure Socket Layer (SSL) handshake published by the Internet Engineering Task Force (IETF) as "Request For Comments (RFC) 6101 entitled "The Secure Sockets Layer (SSL) Protocol Version 3.0." The SSL handshake allows the server to authenticate itself to the first communication device by using public key techniques, and then allows the first communication device and the server to cooperate in the creation of symmetric keys used for rapid encryption, decryption, and tamper detection. Optionally, the handshake also allows the first communication device to authenticate itself with another communication device using the same process.

The authentication object may be a caller ID certificate. The caller ID certificate may include one or more of a version number, an object identifier, a certificate algorithm identifier for certificate issuer's signature, identification of an issuer, a validity period, a subject for the caller ID certificate, public key information, a unique identifier associated with the issuer, a subject unique identifier, identification of extensions, a trusted caller ID certification authority's digital signature and so forth. A number of certificate extensions may be defined to indicate how the caller ID certificate should be used.

In some implementations, the authentication object may comprise a trusted token. The trusted token may be generated and used in lieu of the caller ID certificate. A trusted token may include one or more of a username, a personal identification number, hardware identification number, or a secret shared between the first communication device and the server. Authentication of the trusted token may be based on a challenge/response protocol using the secret contained within the trusted token. A "challenge" is created by the server and sent to the first communication device. The first communication device uses the secret to encrypt the challenge and sends the result back to the server (the "response"). The server also performs the same cryptographic process on the challenge and compares its result to the response from the first communication device.

The second communication device may also register with the server by sending to the server a registration request including registration data to allow the first communication device to have trust the second communication device is correctly identified. The first communication device sends the authentication object to the second communication device. The second communication device may communicate with the server to request validation of the authentication object received from the first communication device.

The first communication device, server, and the second communication device may use one or more networks to communicate. These networks may utilize various technologies such as code division multiple access (CDMA), global system for mobile communications (GSM), signaling system 7, and so forth. Networks may also include public networks such as the Internet, private networks such as an institutional or personal intranet, or some combination of private and public networks. The networks may include any type of wired or wireless network, including but not limited to LANs, WANs, wireless WANs (WWANs), WLANs, and mobile communications networks such as 3G, 4G, LGE, and so forth.

The second communication device may communicate with the server via short-message service (SMS) messaging to request validation of the first communication device. SMS messaging is a mechanism for delivery of short messages over a network. For example, SMS messaging on a CDMA or GSM wireless network may use a signaling channel as opposed to a channel dedicated for transmission of voice data. SMS messages may be sent and received simultaneously with the voice data. The SMS messages are sent over a signaling channel rather than over the voice channel. Signaling channels are used for sending control messages between a communication device and a controller, such as a base station controller.

SMS messaging may be available on wireless networks and wired (or "wireline") networks. SMS messaging may be accessed using telephone handsets, desktop computers, handheld computers, tablet computers, and so forth.

The second communication device may also communicate with the server and send a validation request to the server. The validation request may include one or more of the phone number of the second communication device and the authentication object as received from the first communication device. In one example, the validation request may comprise a trusted token received from the first communication device. The trusted token may have been sent from the first communication device to the second communication device using frequency shift keying (FSK) in-band with voice data of the call. In another implementation, a separate caller ID device may be used to acquire the in-band caller ID information and generate the validation request. Caller ID devices may be separately attached to a phone or phone line to provide caller ID, call waiting and so forth.

The server processes the validation request and returns validation information. The validation information may indicate registration status and validity of the authentication object provided by the first communication device.

In some implementations, the server may send an audio file associated with a user of the first communication device. For example, the first communication device may provide an audio file with the registration data. The audio file may be the user announcing their own name. When the server validates the first communication device, the audio file may be included in the validation information that is returned to the second communication device. When the audio file is received by the second communication device, the audio file may be played, allowing the user of the second communication device to identify the user of the first communication device that initiated the call.

Other techniques may be used to indicate whether the authentication object is valid. In one implementation, the second communication device may use a visual indicator, such as a multicolor light emitting diode (LED) to provide a signal indicative of validation of the first communication device. For example, successful validation of the first communication device may result in the LED emitting a green light. Continuing the example, unsuccessful validation may be indicated by the LED emitting a red light.

The system may be utilized in other ways. In one implementation, users may contact one another even if they do not know the underlying telephone number or network address. For example, users may be assigned pseudo identifier or network addresses that may be used to make calls that are then authenticated, but for which an originating number need not be presented. The ability to use the pseudo identifiers or network addresses may be restricted to particular user accounts, communication devices, dates, times, and so forth.

The system may also facilitate selection of flags, such as an opt-in by a user to receive telemarketing calls from authenticated sources. Telemarketers may then contact users who have opted-in to receiving telemarketer phone calls, with the recipient of that call secure in the knowledge that the originator is authenticated. Telemarketers may pay a fee to register with the server and securely contact potential customers.

By using the system and techniques described in this disclosure, a recipient of a call may be assured as to the identity of the originator of the call. This may facilitate commerce, improve user experience, and provide other benefits.

Illustrative System

FIG. 1 is an illustrative system 100 for providing trusted caller identification (ID). A user 102 having a first communication device 104 wants to initiate a call to another user 106 that has a second communication device 108. First communication device 104 and second communication device 108 may be a wired communication device or a wireless communication device. Wireless communication devices may include mobile phones, tablets computing devices, laptop computers (also referred to as notebook computers or simply as notebooks), handheld computer (or simply handheld), wearable computers, and the like.

A mobile phone is an electronic device used to make and receive phone calls over a radio link or satellite transmissions. The primary wireless connection for a mobile phone is the cellular network that uses cell towers for the transmission between mobile phones and the network. Most mobile phones provide voice communications, Short Message Service (SMS), Multimedia Message Service (MMS), and newer phones may also provide Internet services such as web browsing, instant messaging capabilities, and e-mail. A tablet computer, or simply a tablet, is a mobile computer with all components integrated into a single unit. Tablets rely on touch screen technology as the primary input method. However, tables may also use voice input, external keyboards and other input devices.

Wearable devices are miniature electronic devices worn by the user under, with, or on top of clothing. In many applications for wearable computers, the user's skin, hands, voice, eyes, arms as well as motion or attention of the user 102 are actively engaged as the physical environment through input from sensors of the wearable devices. Wearable devices may be coupled to a mobile phone to provide phone service. Wearable devices may also include an integrated smartphone.

Applications may be installed on laptop computers, desktop computers, tablets, and other devices that usually do not include communication ability that lets users make and receive calls over Wi-Fi® networks. Such applications may allow such devices to use a mobile phone number without a regular SIM card.

To provide trusted caller ID, a first communication device 104 registers 110 with a trusted caller ID authority 112. The trusted caller ID authority 112 may be a central server or may be a plurality of servers provided by a plurality of trusted caller ID authorities 112. The first communication device 104 registers 110 with the trusted caller ID authority 112 by providing registration data 114. In one implementation, a trusted caller ID application may execute on first communication device 104 and be used to register 110 with the trusted caller ID authority 112 by providing registration data 114. The registration data 114 provided to the trusted caller ID authority 112 by the first communication device 104 may include one or more of a phone number, the service provider, a public key, a trusted token, a hardware identifier, such as the International Mobile Station Equipment Identity (IMEI) or Media Access Control (MAC) address, or other such information associated with the first communication device 104. The registration data 114 may include one or more of a phone number assigned to the first communication device 104 using a cross-platform mobile messaging application on the first communication device 104. The registration data 114 may also include location data sent to the trusted caller ID authority 112 by sharing the location of the first communication device 104 obtained via GPS or cell towers. The first communication device 104 may provide the location data to the trusted caller ID authority 112 by sharing the location of the first communication device 104 via data obtained from satellite radio navigation services, cell towers, and so forth. Satellite radio navigation services may include Global Positioning System (GPS), GLObal NAvigation Satellite System (GLONASS), which is a space-based satellite navigation system operated by the Russian Aerospace Defense Forces, and so forth. The trusted caller ID authority 112 may use the location data of the first communication device 104 to notify a second communication device 108 when calls are made by the first communication device 104 from certain locations. For example, the trusted caller ID authority 112 may specify locations associated with the first communication device 104 that have not been recently visited or that are far away from the user's last known location of the first communication device 104.

After storing the registration data 114 in a datastore of the trusted caller ID authority 112, an authentication module 116 authenticates the first communication device 104. The trusted caller ID authority 112 sends an authentication object (AO) 118 to the first communication device 104. The AO 118 may comprise a signed caller ID certificate or a caller ID token, also referred to as a trusted token.

The AO 118 may be created to be cryptographically verifiable by the system to which the AO 118 is to be provided or another system that operates in conjunction with the system to which the AO 118 is to be provided. For example, the AO 118 may be encrypted so as to be decryptable by the system that will cryptographically verify the AO 118, where the ability to decrypt the AO 118 serves as cryptographic verification of the AO 118. As another example, the AO 118 may be digitally signed (thereby producing a digital signature of the AO 118) such that the digital signature is verifiable by the system that will cryptographically verify the AO 118. In other examples, both encryption and digital signatures are used for cryptographic verifiability (and security). The key used to encrypt, digitally sign, or encrypt and digitally sign the AO 118 may vary in accordance with various embodiments and the same key is not necessarily used for both encryption and digital signing, where applicable. In some embodiments, a key used to encrypt the AO 118 is a private key of a public/private key pair where the public key of the key pair is maintained securely by the system to which the AO 118 is to be provided, thereby enabling the system to decrypt the AO 118 using the public key of the key pair. In another embodiment, a key used to encrypt the AO 118 is a public key of a public/private key pair where the private key of the key pair is maintained securely by the system to which the AO 118 is to be provided, thereby enabling the system to decrypt the AO 118 using the private key of the key pair. Using the public key to encrypt the object may include generating a symmetric key, using the symmetric key to encrypt the object, and encrypting the symmetric key using the public key, where the encrypted symmetric key is provided to a system with the encrypted AO 118 to enable the system to use the corresponding private key to decrypt the symmetric key and use the decrypted symmetric key to decrypt the object. Further, in some embodiments, the AO 118 is digitally signed using a private key of a public/private key pair corresponding to the computer system that encrypts and/or digitally signs the AO 118. For example, an application may be provisioned with the private key and the AO 118 may include a certificate for the private key for use by a system for verification of the digital signature of the AO 118. Other variations, including variations where a symmetric key shared between the user computer and the system that cryptographically verifies the AO 118 is used to encrypt the AO 118, digitally sign the AO 118, or both encrypt and digitally sign AO 118. The object may be implemented as a file, a digital artifact, or both.

The trusted caller ID authority 112 uses the registration data 114 to register the first communication device 104 and to authenticate the first communication device 104 by determining that at least a portion of the registration data 114 associated with the first communication device 104 corresponds to identification data accessed from a third party source 132. When the first communication device 104 is authenticated, the first communication device 104 receives an authentication object 118 from the trusted caller ID authority 112.

The authentication object 118 may comprise a caller ID certificate. A caller ID certificate may include one or more of the following: a version number, an object identifier, a certificate algorithm identifier for certificate issuer's signature, an identification of an issuer, a validity period, a subject for the caller ID certificate, public key information, a unique identifier associated with the issuer, a subject unique identifier, identification of extensions, and a trusted caller ID certification authority's digital signature. A number of extensions to the caller ID certificate may be defined to indicate how the caller ID certificate should be used. For example, extensions to the caller ID certificate may be used to define specific application policies, issuance policies, caller ID certificate subject types, and key usage attributes.

Alternatively, the authentication object 118 may be a trusted token that is generated and used in lieu of the caller ID certificate. However, the trusted token provides less security than a signed caller ID certificate. For example, a trusted token may include a username, a personal identification number, hardware identification number, and a secret shared between the first communication device 104 and the trusted caller ID authority 112. Authentication of the trusted token may be based on a challenge/response protocol using the secret contained within the trusted token. A "challenge" is created by the server and sent to the first communication device. The first communication device uses the secret to encrypt the challenge and sends the result back to the server (the "response"). The server also performs the same cryptographic process on the challenge and compares its result to the response from the first communication device. However, security may be compromised because the cryptographic material in a trusted token can be duplicated and the secret may be captured the next time the user authenticates by, for example, key loggers, man-in-the-middle attacks, and the like.

After receiving the authentication object 118, the first communication device 104 initiates a call 120 and passes the authentication object 118 to the second communication device 108. The user 106 having the second communication device 108 validates the identity of the first communication device 104 using the authentication object 118. The second communication device 108 sends a validation request 122 to the trusted caller ID authority 112. The trusted caller ID authority 112 validates the registration of the first communication device 104 and the identity of the first communication device 104 using the registration data 114. A trusted caller ID application, e.g., executed on the second communication device, may automatically validate the first communication device 104 using the standard SSL handshake. To request validation of the first communication device 104 from trusted caller ID authority 112 using the authentication object 118 of first communication device 104, the second communication device 108 may contact the trusted caller ID authority 112 over a network 124, such as a data network, or via SMS messaging.

A data network may be a switched network that forwards data units between network interfaces of network nodes using identifiers associated with the target circuit or communication path being setup through the network. Examples of networks may include Asynchronous Transfer Mode (ATM) networks, Multiprotocol Label Switching (MPLS) networks, Internet Protocol (IP) networks, and so forth. The second communication device 108 may also contact the trusted caller ID authority 112 via SMS messaging to request authentication of the first communication device 104.

Commonly, SMS messaging has been provided by digital cellular phones, but more recently, SMS has been extended to other technologies such as desktop computers, handheld computers, and PDAs. The second communication device 108 may initiate a call to the trusted caller ID authority 112 and provide the phone number of the second communication device 108 and a trusted token of the first communication device 104 using inband frequency shift keying (FSK). The call may be made by the second communication device 108 via voice network, such as a cellular telephone network, including CDMA or GSM communications, GPRS, or any network allowing for communication over a broad area.

A caller ID device 126 may receive in-band caller ID information using the same channel as the call. The caller ID device 126 may then access the trusted caller ID authority 112 to validate the caller ID. Different types of caller ID devices 126 may be used. Caller ID devices 126 may be generally classified based on which services they offer and how they offer those services. Some, for instance, only tell the phone number of the person calling, while others identify the caller's name and location. Caller ID devices 126 may also work on analog, digital, and Internet-based communication devices. Caller ID devices 126 may decode the incoming call in order to determine the number of the phone at the call's origin.

Caller ID devices 126 may also provide caller ID services, such as analog, digital, Voice over Internet Protocol (VoIP) caller ID, Automatic Number Identification (ANI), call waiting ID and so forth. ANI is the identification of callers based on their phone numbers. The ANI service is provided by sending a digital multi-frequency tone (DTMF) along with a call. The DTMF provides a unique number ranging from one to eight digits in length. A caller's telephone number is captured by an ANI service even if caller ID blocking is activated in it. The telephone company switching office at the destination provides the caller's telephone number to ANI delivery service subscribers. Residential subscribers can also access ANI data through some third party companies that charge for the service. Calls through VoIP service and calling cards send a working number as ANI.

When a call is from a standard loop telephone line, called a Plain Old Telephone System (POTS) exchange, the local switch of the service provider provides the identification details. The actual connection is made only when the recipient answers the phone, so the caller cannot alter this type of caller identification, although it is possible to block it by entering a code prior to dialing the recipient's phone number.

After the second communication device receives the authentication object 118, the second communication device 108 contacts the trusted caller ID authority 112 to request validation of the first communication device 104. The trusted caller ID authority 112 responds by processing the authentication object 118. The authentication object 118 is compared to the registration data 114 associated with the first communication device 104. The registration data 114 is maintained in a datastore of the trusted caller ID authority 112. The authentication object 118 may include an indication of trustworthiness of the authentication of the first communication device 104 based on the comparison of the data of the authentication object 118 to the registration data 114. For example, the indication of trustworthiness of the authentication of the first communication device 104 may be provided as a low level of trust, a medium level of trust, or a high level of trust. For example, a low level of trust may be based on the registration data 114 correlating to a single third party source 132. The caller ID of the first communication device 104 may be the only source used by the trusted caller ID authority 112 to register the first communication device 104 and therefore provides only a low level of trust. A medium level of trust may reflect higher correlation of the registration data 112 with the third party source 132. A high level of trust may reflect complete correlation between the registration data and the data from the third party source 132.

The trusted caller ID authority 112 may then use the authentication object 118 to process the validation request 122 at validation module 128. After receiving and processing the validation request 122, the trusted caller ID authority 112 generates validation information 130, which the trusted caller ID authority 112 sends to the second communication device 108. The validation information 130 may include the registration status and authentication status of the first communication device 104.

The trusted caller ID authority 112 may send an audio file associated with a user 102 of the first communication device 104. For example, the first communication device 104 may provide an audio file with the registration data 114 to identify the user 102. The audio file included with the registration data 114 may be a recording of the voice of the user of the first communication device, a music sample, and so forth. When the trusted caller ID authority 112 validates the first communication device 104, the audio file may be included in the validation information 130 provided to the second communication device 108. When the validation information 130 is received by the second communication device 108, the second communication device 108 may play the audio file to identify the user 102 of the first communication device 104 that is making the call.

The second communication device 108 may also use a visual indicator, such as a multicolor light emitting diode (LED), to signal whether the first communication device 104 has been validated. For example, to indicate successful validation of the first communication device 104, a multicolor LED may emit a first color of light, such as green light. Continuing the example, to indicate unsuccessful validation of the first communication device 104, the multicolor LED may emit a second color of light, such as red light.

Pending United States patent application filing number Ser. No. 14/810,275 entitled "Trustworthy Indication of Software Integrity" to inventor Daniel Wade Hitchcock and filed on Jul. 27, 2015 is hereby incorporated by reference in its entirety. For additional security, one or more of the mechanisms disclosed in application Ser. No. 14/810,275 may be used to ensure that the output provided by the light, or other output device, is "trustworthy" and has not been tampered with.

Another indication of validation of the caller ID associated with the first communication device based on linking a trusted caller ID account of the first communication device 104 with the a social media service associated with user 102 of the first communication device 104. When the first communication device 104 registers with the trusted caller ID authority 112, the first communication device 104 is assigned a trusted caller ID account with the trusted caller ID authority 112. The first communication device 104 may link a trusted caller ID account of the trusted caller ID authority 112 with an account of a social media service associated with user 102 of the first communication device 104, or add a custom photograph or avatar for display on the second communication's phone 108. A photograph associated with a user 102 of the first communication device 104 may be provided by the validation information 130 when validation of the first communication device 104 is successful. By linking the trusted caller ID account associated with the user 102 of the first communication device 104 to their social media server, a photograph from the social media server may be provided to the trusted caller ID authority 112 for use as a caller ID indicator at the second communication device 108. The photograph provided to the second communication device 108 may be updated when the account of the social media service associated with the first communication device 104 is changed.

In addition, a return call may be made by the second communication device 108 by selecting at the second communication device 108 callback credentials, such as a photograph, avatar, or a pseudo identifier, without the user 106 of the second communication device 108 knowing the phone number of the first communication device 104. Such callback credentials may be controlled by the first communication device 104 and may be revoked.

To authenticate the registration data 114 from the first communication device 104, the trusted caller ID authority 112 may access identification data from a third party source 132. Third party sources 132 may be banks, payment processors, a merchant, government sources, a state's department of motor vehicles database, and so forth. The trusted caller ID authority 112 determines at least a portion of the registration data 114 is associated with the first communication device 104 based on a comparison of the registration data 114 to the identification data accessed from a third party source 132.

Figure 2:
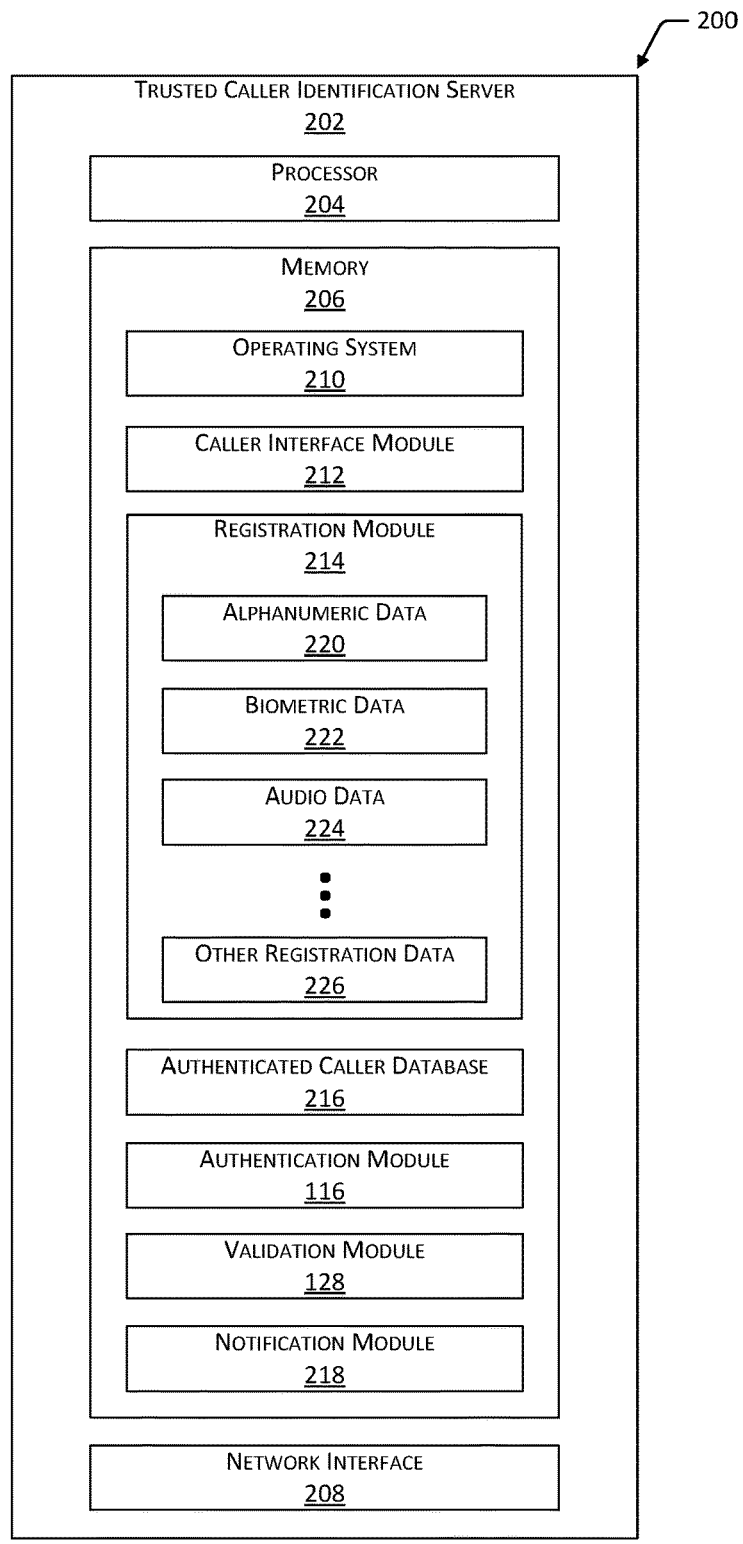
FIG. 2 is a block diagram illustrating a trusted caller ID server within the scope of the present disclosure.

FIG. 2 is a block diagram 200 illustrating a trusted caller identification server 202, which includes a hardware processor 204 (processor), a memory 206, and a network interface 208. The processors 204 may be configured to perform various operations according to machine-executable program instructions. The processor 202 may include one or more cores. The processor 204 may comprise one or more commercially available microprocessors or microcontrollers that facilitate data processing and storage. The memory 206 includes at least one of read only memory (ROM), random access memory (RAM), disk drive storage, optical storage, removable storage, and so forth. In some implementations, the memory 206 may include an operating system (OS) 210, a caller interface module 212, a registration module 214, an authenticated caller database 216, and a notification module 218.

The OS 210 generally manages various computer resources (e.g., network resources, file processors, and so forth). The OS 210 may be configured to execute operations on one or more hardware and software modules, such as Network Interface Cards (NICs), hard disks, virtualization layers, firewalls, and so forth. The OS 210 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

In some implementations, the caller interface module 212 may be used to accept the authentication object 118 from the second communication device 108 when the first communication device 104 attempts to initiate a call 120 to the second communication device 108. The second communication device 108 requests validation of the first communication device 104. The caller interface module 212 processes the authentication object 118 to parse data for comparison to data in the registration module 214 to determine whether a first communication device 104 has been registered and authenticated.

The registration module 214 stores registration data 114 from a first communication device 104. An authentication module 116 is used to authenticate the first communication device 104 using the registration data 114 by determining that at least a portion of the registration data 114 associated with the first communication device 104 corresponds to the identification data accessed from a third party source 132.

The authentication module 116 provides the first communication device 104 with an authentication object 118 that identifies callers or devices associated with the first communication device 104 as trusted entities. A validation module 128 receives from the second communication device 108 a validation request 122 that includes the authentication object 118. The validation module 128 generates validation information 130, which is sent to the second communication device 108. The validation information 130 may include the registration status and authentication status of the first communication device 104. During registration, the first communication device 104 may provide registration data 114 to the trusted caller ID server 202. The registration data 114 provided to the trusted caller ID authority 112 may include one or more of a phone number of the first communication device 104, the service provider of the first communication device 104, a public key of the first communication device 104, a trusted token, a hardware identifier, such as the IMEI or MAC address, or other such information associated with the first communication device 104. The registration data 114 may include one or more of a phone number assigned to the first communication device using a cross-platform mobile messaging application on the first communication device 104. For example, the cross-platform mobile messaging application may facilitate telephone calls, video conferencing, and so forth across communication devices that utilize different networks, operating systems, and so forth. The registration data 114 may also include location data that is sent to the trusted caller ID authority 112 by sharing the location of the first communication device 104 obtained by via satellite radio navigation services.

The communication device 104 may register with the trusted caller ID authority 112 by sending registration data 114 to the trusted caller ID authority 112. The registration module 214 may include alphanumeric data 220, biometric data 222, audio data 224, and other registration data 226. Alphanumeric data 220 may include information provided to the trusted caller ID authority 112 using a keyboard or keypad. Biometric data 222 is data from a biometric sensor that is unique to the user 102 of the first communication device 104 and provides an identity associated with the user 102 of the first communication device 104. The biometric data 222 may be collected by one or more input devices. For example, a microphone may be used to capture speech used for analysis, a camera may acquire images used for facial recognition, and a fingerprint scanner may acquire fingerprints, and so forth. The biometric data 222 may be include information indicative of vein patterns under the skin, unique features in the fingertip, hand geometry, iris pattern, retinal pattern, palm print, and so forth. Biometric data 222 may further include keystroke dynamics, ear shape, signature, and so forth.

The trusted caller identification server 202 of trusted caller ID authority 112 uses the registration data 114 to authenticate the first communication device 104. When the first communication device 104 is authenticated, the first communication device 104 receives an authentication object 118 from the trusted caller ID authority 112. The authentication object 118 may be a caller ID certificate. Alternatively, a trusted token may be generated and used in lieu of the caller ID certificate. However, the trusted token provides less security than use of a signed caller ID certificate. For example, a trusted token may include a username, a personal identification number, hardware identification number, and a secret shared between the first communication device 104 and the trusted caller ID authority 112. Authentication of the trusted token may be based on a challenge/response protocol using the secret contained within the trusted token. A "challenge" is created by the trusted caller ID authority 112 and sent to the first communication device 104. The first communication device 104 uses the secret to encrypt the challenge and sends the result back to the trusted caller ID authority 112 (the "response"). The trusted caller ID authority 112 also performs the same cryptographic process on the challenge and compares its result to the response from the first communication device 104.

The registration module 214 associates directory information (e.g., a telephone number) with validation information 130. The directory information may indicate, for instance, a caller ID value, an ANI number (for SS7), a P-asserted ID (for VoIP), and so forth. By way of example, the registration module 214 maintains a registered number database that corresponds to directory information (e.g., "caller ID" and ANI/P-asserted ID) using one or more of digital alphanumeric data 220, biometric data 222, audio data 224, and other registration data 226. As discussed above, the first communication device 104 may send registration data 114 to the trusted caller ID authority 112 for providing authentic caller ID services.

The trusted caller identification server 202 of the trusted caller ID authority 112 may automatically validate the first communication device 104 using the standard SSL handshake without user input. The second communication device 108 may send the authentication object 112 to the trusted caller ID authority 112 over a digital packet network or via SMS messaging to request authentication of the first communication device 104. Alternatively, the second communication device 108 may initiate a call to the trusted caller ID authority 112 and provide the phone number of the second communication device 108 and a trusted token of the first communication device 104 using frequency shift keying (FSK). In another embodiment, a caller ID device 126 may be used to get in-band caller ID information. The caller ID device 126 may then access the trusted caller identification server 202 of the trusted caller ID authority 112 to authenticate the caller ID. Caller ID devices 126 may be categorized based on which services they offer and how they offer those services. Some, for instance, only tell the phone number of the person calling, while others identify the caller's name and location. Caller ID devices 126 may also work on analog, digital, and Internet-based phone services. Caller ID devices 126 may decode the incoming call in order to determine the number of the phone at the call's origin.

Caller ID devices 126 may also provide caller ID services, such as analog, digital, VoIP caller ID, ANI, and call waiting ID. ANI is the identification of callers based on their phone numbers.

When a call 120 is from a standard loop telephone line, called a POTS exchange, the local switch of the service provider provides the identification details. The actual connection is made only when the recipient answers the phone, so the caller cannot alter this type of caller identification, although it is possible to block it. The accepted authentication object 118 may be used as a lookup key to authenticated caller database 216 to determine if the first communication device 104 is stored in the authenticated caller database 216 as an authenticated device.

Once the first communication device 104 is validated as being authenticated in the authenticated caller database 216, the trusted caller identification server 202 of the trusted caller ID authority 112 may notify the second communication device 108 using notification module 218 that the first communication device 104 has been authenticated. Validation information 130 is provided from the trusted caller identification server 202 of the trusted caller ID authority 112 to the second communication device 108. The validation information 130 provided from the trusted caller identification server 202 of the trusted caller ID authority 112 to the second communication device 108 indicates registration status and authentication status of first communication device 104.

The trusted caller identification server 202 of the trusted caller ID authority 112 may prepend an audio file associated with a user 102 of the first communication device 104 with the authentication information associated with the first communication device 104. For example, the first communication device 104 may provide an audio file with the registration data 114. When the trusted caller ID authority 112 validates the first communication device 104, the audio file may be included with the validation information 130 provided to the second communication device 108. When the validation information 130 is received by the second communication device 108, the second communication device 108 may play the audio file to identify the user 102 of the first communication device 104 that is making the call.

The second communication device 108 may also use a visual indicator, such as a multicolor light emitting diode (LED), to signal whether the caller ID of the first communication device 104 has been validated. For example, to indicate successful validation of the first communication device 104, a multicolor LED may emit a first color of light, such as a green light. Continuing the example, to indicate unsuccessful validation of the first communication device 104, the multicolor LED may emit a second color of light, such as red light.

To prevent fraud, the trusted caller ID authority 112 may track failed validation attempts. The first communication device 104 may contact the trusted caller ID authority 112 to provide notification of the failed validation attempt so the first communication device 104 may rotate its private keys to safeguard the authentication object 118 associated with the first communication device 104. The user 102 of the first communication device may also contact the Federal Communications Commission or its service provider to provide an alert of such fraudulent use. The service provider may take additional steps to prevent the caller ID associated with the first communication device 104 from being fraudulently used by tracking further fraudulent use of the authentication object 118 of the first communication device.

To provide another indication of validation of the first communication device, the first communication device 104 may link a trusted caller ID account of the trusted caller ID authority 112 with an third party accounts. For example, the trusted caller ID account may be linked to an account for a social media service. The trusted caller ID account may be linked to, or include other types of information. For example, a custom photograph or avatar for display on the second communication device 108 may be associated with the trusted caller ID account. The I/O devices 306 may also include one or more of an authentication indicator device 308, a biometric data input device 310, an audio data input device 312, an alphanumeric data input device 314, and so forth. In some implementations, the I/O devices 306 may be physically incorporated with the communications device 104 or 108 or may be externally placed.

The communication devices 104 or 108 may also include one or more communication interfaces 316 including a network interface 340. The communication interfaces 316 are configured to provide communication between the communication devices 104 or 108. The communication interfaces 316 may include devices configured to couple to one or more networks including personal area networks (PANs), local area networks (LANs), wireless local area network (WLANs), wide area networks (WANs), and so forth. The communication devices 104 or 108 may also include one or more busses or other internal communications hardware or software that allow for the transfer of data between the various modules and components of the communication devices 104 or 108.

Figure 3:
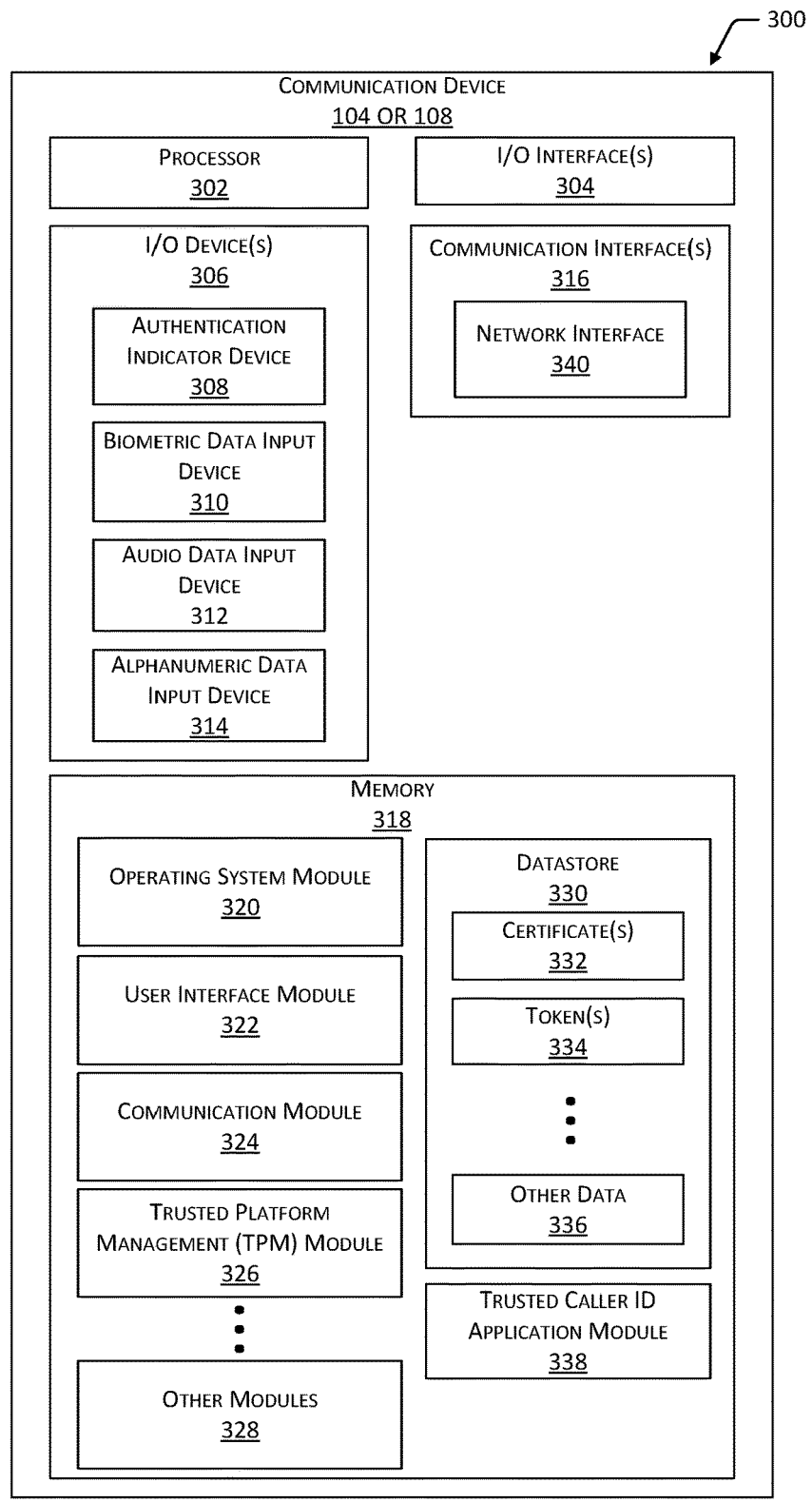
FIG. 3 is a block diagram illustrating a communication device within the scope of the present disclosure.

As shown in FIG. 3, the communication devices 104 or 108 include one or more memories 318. The memory 318 comprises one or more computer-readable storage media (CRSM), such as hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. The memory 318 provides storage of computer readable instructions, data structures, program modules, and other data for the operation of the communication devices 104 or 108. The memory 318 may include at least one OS module 320. The OS module 320 is configured to manage hardware resource devices such as the I/O interfaces 304, the I/O devices 306, the communication interfaces 316, and provide various services to applications or modules executing on the processors 302. Also stored in the memory 318 may be one or more of the following modules. These modules may be executed as foreground applications, background tasks, daemons, and so forth.

A user interface module 322 may be configured to provide one or more application programming interfaces. The user interface module 322 is configured to accept inputs and send outputs using the I/O interfaces 304, the communication interfaces 316, or both. A communication module 324 is configured to support communication with other communication devices using one or more networks 124. In some implementations, the communication module 324 may support encrypted communications. For example, Hypertext Transport Protocol Secure (HTTPS) or Transport Layer Security (TLS) may be supported. A trusted platform management (TPM) module 326 may be used to verify integrity of location data or other data by providing platform authentication so the location data is securely associated with the first communication device 104. Other modules 328 may also be present, such as camera modules, scanner modules, input modules, and so forth.

The memory 318 may also include a datastore 3308 to store information. The datastore 330 may use a flat file, database, linked list, tree, executable code, or other data structure to store the information. In some implementations, the datastore 330 or a portion of the datastore 330 may be distributed across one or more other devices including servers, network attached storage devices, and so forth.

When the first communication device 104 is authenticated, the first communication device 104 receives an authentication object 118 from the trusted caller ID authority 112. As depicted here, the datastore 330 may store the authentication object 118, such as one or more of caller ID certificates 332, tokens 334 used for trusted caller ID, and so forth. A caller ID certificate 332 may include one or more of a version number, an object identifier, a certificate algorithm identifier for certificate issuer's signature, an identification of the issuer of the caller ID certificate, a validity period, a subject for the caller ID certificate, public key information, an issuer unique identifier, a subject unique identifier, identification of extensions, and a trusted caller ID certification authority's digital signature. A number of extensions to the caller ID certificate may be defined to indicate how the caller ID certificate should be used.

Alternatively, the authentication object 118 may be a caller ID token 334 that is generated and used in lieu of the caller ID certificate 332. However, the caller ID token 334334 provides less security than use of a signed caller ID certificate 332. For example, a caller ID token 334334 may include a username, a personal identification number, hardware identification number, and a secret shared between the first communication device 104 and the trusted caller ID authority 112. Authentication of the caller ID token 334 may be based on a challenge/response protocol using the secret contained within the caller ID token 334. A "challenge" is created by the trusted caller ID authority 112 and sent to the first communication device 104. The first communication device 104 uses the secret to encrypt the challenge and sends the result back to the trusted caller ID authority 112 (the "response"). The trusted caller ID authority 112 also performs the same cryptographic process on the challenge and compares its result to the response from the first communication device 104.

Other data 336 may also be stored in datastore 330. For example, the other data 336 may include user preferences, configuration files, user account information, content encryption keys, and so forth. Trusted caller ID, e.g., a trusted identification of the phone number associated with a call, as disclosed herein, may be provided using a trusted caller ID application module 338 executing on the communication device 104 or 108. The communication device 104 or 108 may communication with the trusted caller ID authority 112 via communication interfaces 318, including network interface 340.

Figure 4:
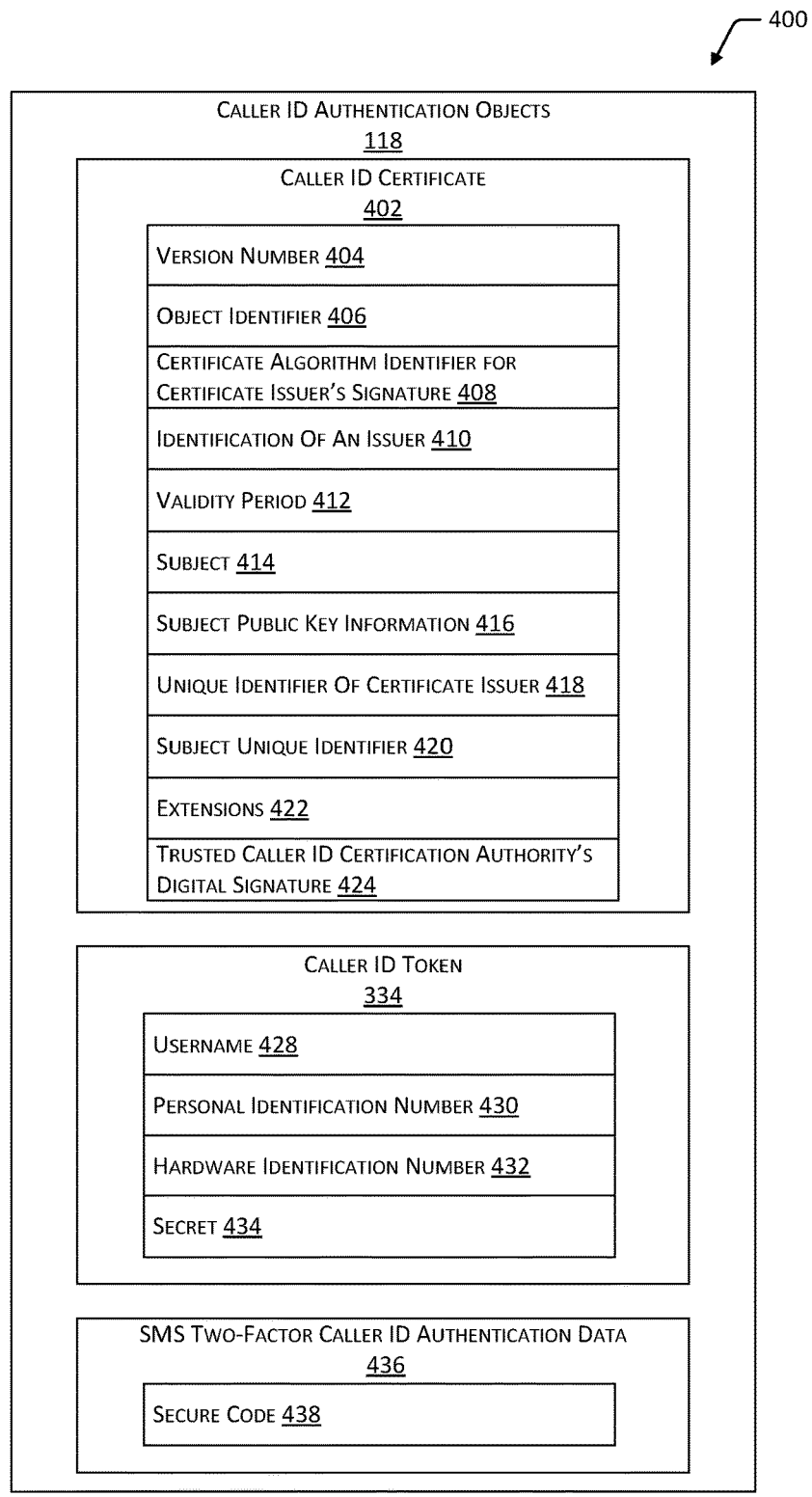
FIG. 4 is a block diagram illustrating caller ID authentication objects within the scope of the present disclosure.

FIG. 4 is a block diagram 400 illustrating caller ID authentication objects 118. As described above, the trusted caller ID authority 112 uses the registration data 114 to authenticate the first communication device 104. When the first communication device 104 is authenticated, the first communication device 104 receives an authentication object 118 from the trusted caller ID authority 112.

In FIG. 4, a caller ID authentication object 118 may be a caller ID certificate 402. The caller ID certificate 402 may include a version number 404, an object identifier 406, a certificate algorithm identifier for certificate issuer's signature 408, an identification of an issuer 410, a validity period 412, a subject 414 for the caller ID certificate 402, a subject public key information 416, a unique identifier of certificate issuer 418, subject unique identifier 420, identification of extensions 422, and a trusted caller ID certification authority's digital signature 424. The issuer 410 is used to identify the issuer of the caller ID certificate 402, where there may be different trusted caller ID authorities 112. The subject 414 identified in the caller ID certificate 402 identifies the communication device associated with the caller ID certificate 402. A number of extensions 422 to the caller ID certificate 402 may be defined to indicate how the caller ID certificate 402 should be used. The caller ID certificate 402 may be customized with a number of extensions 422 that regulate their use. These extensions 422 may include issuance policies, application policies, key usage, key archival, and other constraints. For example, an issuance policy (also known as an enrollment or certificate policy) is a group of administrative rules that are implemented when issuing the caller ID certificate 402. Administrative rules may be used to define when a caller ID certificate 402 may be extended, when the caller ID certificate 402 expires, and so forth. When the first communication device 104 presents a caller ID certificate 402, the caller ID certificate 402 may be examined by the second communication device 108 to verify the issuance policy. Application policies provide the ability to decide which caller ID certificate 402 may be used for certain purposes. For example, application policies may define the user of different caller ID certificates 402 for cellphones, satellite phones, and so forth. Key usage is a restriction method that identifies what tasks a caller ID certificate 402 may be used for. Key archival allows constraints on how keys of a subject 414 may be encrypted and archived in the trusted caller ID authority 112 where caller ID certificates 402 are issued. Other constraints may be used to ensure that caller ID certificates 402 are only used in certain applications, such as cellular phone calls, SMS messaging, and so forth.

The information provided by the caller ID certificate 402 may be used by the second communication device 108 to authenticate the first communication device 104. The second communication device 108 sends the caller ID certificate 402 to the trusted caller ID authority 112 for verification of registration and authenticity of the first communication device 104 using information provided by the caller ID certificate 402.

A caller ID token 334 may include one or more of a username 428 of the user 102 of the first communication device 104, a personal identification number 430, a hardware identification number 432, and a secret 434 shared between the user 102 and the trusted caller ID authority 112. Authentication of the caller ID token 334 may be based on a challenge/response protocol using the secret 434 contained within the caller ID token 334. A "challenge" is created by the trusted caller ID authority 112 and sent to the first communication device 104. The first communication device 104 uses the secret to encrypt the challenge and sends the result back to the trusted caller ID authority 112 (the "response"). The trusted caller ID authority 112 also performs the same cryptographic process on the challenge and compares its result to the response from the first communication device 104.

For two-factor SMS messaging authentication, a SMS two-factor caller ID authentication data 436 is provided. The SMS two-factor caller ID authentication data 436 uses a secure code 438 to ensure privacy by allowing encryption of calls and to enable authentication of the first communication device 104. For authentication, the trusted caller ID authority 112 requests the user 102 provide a secure code 438 that is then compared to one provided with the registration data 114.

Figure 5:
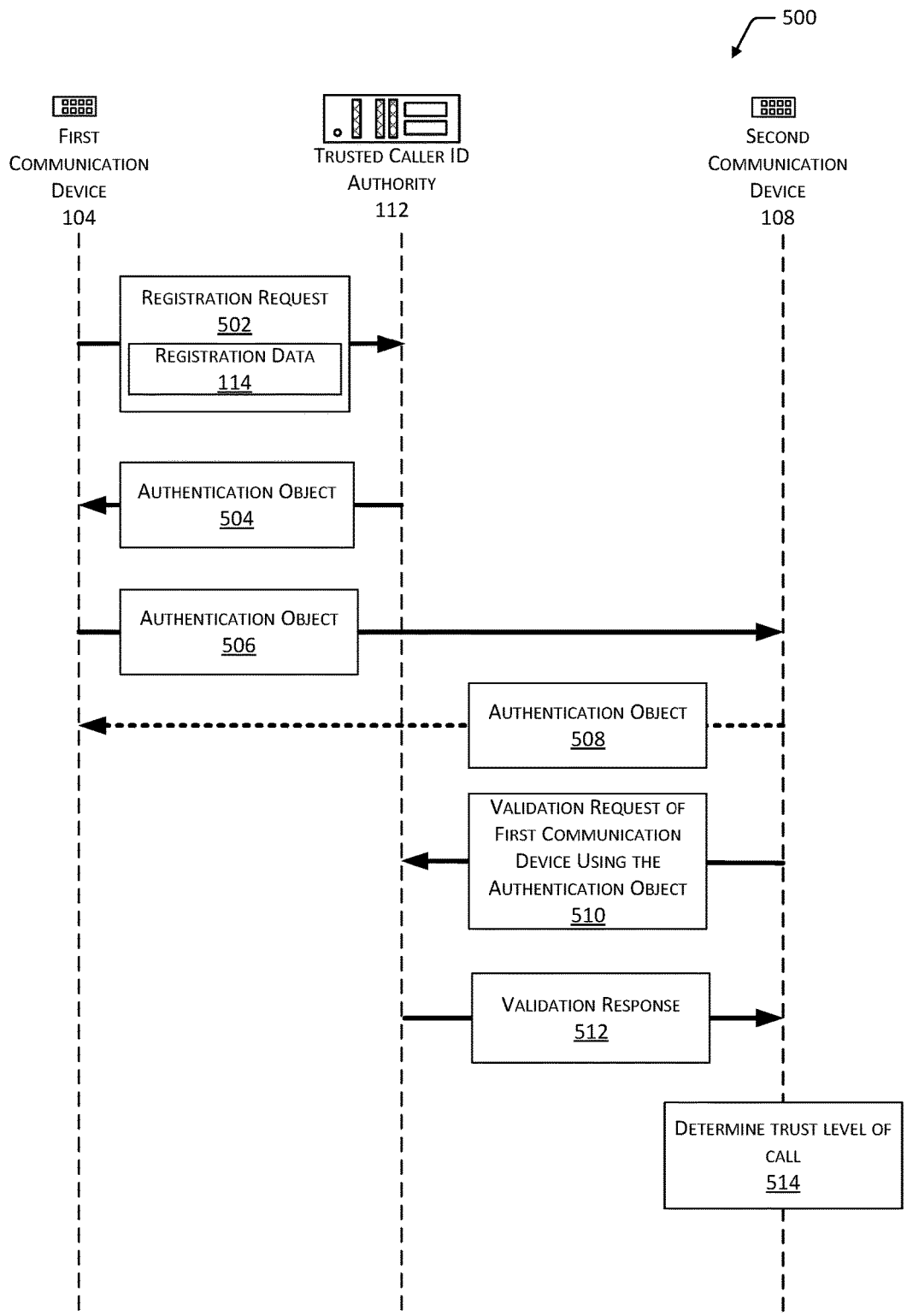
FIG. 5 illustrates signal messaging for providing trusted caller ID authentication.

FIG. 5 illustrates signal messaging 500 for providing trusted caller ID authentication. In FIG. 5, a first communication device 104 sends a registration request 502 to a trusted caller ID authority 112. To register with the trusted caller ID authority 112, the first communication device 104 includes registration data 114 in the registration request 502. The registration data 114 provided to the trusted caller ID authority 112 by the first communication device 104 may include the following: a phone number, the service provider, a public key, a caller ID token 334, a hardware identifier, such as the IMEI or MAC address, or other such information.

The registration data 114 may also include location data that is sent to the trusted caller ID authority 112 by sharing the location of the first communication device 104 obtained by via GPS or cell towers. The first communication device 104 may provide the location data to the trusted caller ID authority 112 by sharing the location of the first communication device via 104 data obtained from satellite radio navigation. The trusted caller ID authority 112 may use the location data of the first communication device 104 to provide an indication of trust about the first communication device 104 to a second communication device 108. For example, a call made by the first communication device 104 from a location that has not been previously associated with the first communication device 104 or is far away from the last known location of the first communication device 104 may be designated as having a low level of trust.

The trusted caller ID authority 112 uses the registration data 114 to register and authenticate the first communication device 104. To authenticate the registration data 114 from the first communication device 104, the trusted caller ID authority 112 may access identification data from a third party source 132. The trusted caller ID authority 112 determines at least a portion of the registration data 114 is associated with the first communication device 104 based on a comparison of the registration data 114 to the identification data accessed from a third party source 132.

When the trusted caller ID authority 112 authenticates the first communication device 104, the trusted caller ID authority 112 sends an authentication object 504 to the first communication device 104. The authentication object 504 may be a caller ID certificate 402. A caller ID certificate 402 may include one or more of a version number 404, an object identifier 406, a certificate algorithm identifier for certificate issuer's signature 408, an identification of an issuer 410, a validity period 412, a subject 414 for the caller ID certificate, a subject public key information 416, a unique identifier associated with the issuer 418, a subject unique identifier 420, identification of extensions 422, and a trusted caller ID certification authority's digital signature 424. A number of extensions 422 to the caller ID certificate 402 may be defined to indicate how the caller ID certificate 402 should be used. Extensions 422 have a variety of uses for identifying both the caller ID certificate and the trusted caller ID authority 112 that issues the caller ID certificate 402, as well as determining under what usages the caller ID certificate 402 is valid. While there are a range of standard extensions 422, in some case, people even make up their own if it suits their organization. For example, extensions 422 may be used to convey such data as additional subject identification information, key attribute information, policy information, and certification path constraints. Extensions 422 also provide methods for associating additional attributes. For example, extensions 422 may be used to define attributes, such as specific application policies, issuance policies, certificate subject types, key usage attributes, and so forth.

Alternatively, the authentication object 118 may be a caller ID token 334 that is generated and used in lieu of the caller ID certificate 402. For example, a caller ID 334 token 334 may include a username 428, a personal identification number 430, hardware identification number 432, and a secret 434 shared between the first communication device 104 and the trusted caller ID authority 112. Authentication of the caller ID token 334 may be based on a challenge/response protocol using the secret 434 contained within the caller ID token 334. A "challenge" is created by the trusted caller ID authority 112 and sent to the first communication device 104. The first communication device 104 uses the secret to encrypt the challenge and sends the result back to the trusted caller ID authority 112 (the "response"). The trusted caller ID authority 112 also performs the same cryptographic process on the challenge and compares its result to the response from the first communication device 104.

After receiving the authentication object 118, the first communication device 104 initiates a call 120 with a second communication device 108 and provides the authentication object 506 to the second communication device 108. In one implementation, the second communication device 108 may send an authentication object 508 of its own to the first communication device 104 for mutual authentication between the first communication device 104 and the second communication device 108. The first communication device 104 and the second communication device 108 may each send a validation request 122 to the trusted caller ID authority 112 for mutual validation. If the second communication device 108 has not previously registered, the second communication device 108 may need to register with the trusted caller ID authority 112. A link to registration may be displayed on the second communication device 108. Registration data 114 may also be cached or accessible on the trusted caller ID authority 112, an intermediate server, proxy server, and so forth.

An authentication object 118 that is cached by the second communication device 108 may expire. When an authentication object has expired, the trusted caller ID authority 112 will no long validate the first communication device 104. The second communication device 108 may also receive expired data from the trusted caller ID authority 112, an intermediate server, proxy server, and so forth. For example, expired data may include a digital signature 424 of the trusted caller ID authority 112. To provide trusted caller ID where the data has expired, e.g., the location of the first communication device 104 has changed, the authentication object 118 may need to be refreshed by the first communication device 104 updating the registration data 114 at the trusted caller ID authority 112.

The first communication device 104 may also provide the second communication device 108 a trusted token, e.g., a caller ID token 334, to provide an identification of the first communication device 104. If the second communication device 108 has cached the public key of the first communication device 104, the second communication device 108 may validate the identity of the first communication device 104 by decrypting the cached caller ID token 334 and comparing it to the received caller ID token 334.

The second communication device 108 sends a validation request 510 to the trusted caller ID authority 112 to validate the first communication device 104 using the authentication object 118.

The trusted caller ID application executing on the second communication device 108 may authenticate the first communication device 104 using the standard SSL handshake. The second communication device 108 may contact the trusted caller ID authority 112 over a network, such as network 124. For example, the second communication device 108 may contact trusted caller ID authority 112, using a data network 124 or via SMS messaging, to request authentication of the first communication device 104 from trusted caller ID authority 112 using the authentication object 118 of first communication device 104. As described above, a data network 124 may be a switched network that forwards data units between network interfaces of network nodes using identifiers associated with the target circuit being setup through the network 124. The second communication device 108 may also contact the trusted caller ID authority 112 via SMS messaging to request authentication of the first communication device 104.

The second communication device 108 may alternatively initiate a call to the trusted caller ID authority 112 and provide the phone number of the second communication device 108 and a caller ID token 334 of the first communication device 104 using in-band FSK. The call may be made by the second communication device 108 via a network 124, such as a cellular telephone network, including CDMA, GSM communications, GPRS, or any network 124 allowing for communication over a broad area.

Caller ID devices 126 may also provide caller ID services, such as analog, digital, VoIP caller ID, ANI, and call waiting ID. When a call is from a standard loop telephone line, called a POTS exchange, the local switch of the service provider provides the identification details. The actual connection is made only when the recipient answers the phone, so the caller cannot alter this type of caller identification, although it is possible to block it.

An authentication object 118 for the first communication device 104 may be regenerated using the public key of the first communication device 104. The regenerated authentication object 118 may then be verified by the trusted caller ID authority 112 against the authentication object 118 sent by the second communication device 108. In addition, a public key may be cached by the second communication device 108 to verify the authentication object 118 without the second communication device 108 contacting the trusted caller ID authority 112.

When the trusted caller ID authority 112 has validated the first communication device 104 using the authentication object 118, the trusted caller ID authority 112 returns a validation response 512 with validation information 130 indicating the registration status and authentication status of the first communication device 104 to the second communication device 108. The validation response 512 may include audio associated with a user 102 of the first communication device 104 with the validation information 130 associated with the first communication device 104. For example, the first communication device 104 may provide an audio file with the registration data 114 that is included with the validation information 130 and played by the second communication device to identify the user 102 of the first communication device 104. The second communication device 108 may also use a visual indicator, such as a multicolored LED to signal whether the caller ID has been validated. In the background, a process may continuously, or periodically, update information provided by the validation response 512.

The second communication device 108 may use the validation response 512 to determine a trust level associated with a call 514. In addition or alternatively to providing authentication status of the first communication device 104 in the validation response 512, the validation response 512 may also include information regarding the first communication device 104, such as the phone number, an IP address, location information, and so forth. The second communication device 108 may make a decision on whether to trust the first communication device 104 using the validation response 512. The second communication device 108 may also setup a private or an encrypted call between the first communication device 104 and the second communication device 108. The encrypted call may be setup using the public keys of the first communication device 104 and the second communication device 108. The second communication device 108 uses the public key of the first communication device 104 to encrypt its transmissions, while the first communication device 104 uses the public key of the second communication device 108 to encrypt its transmissions. The second communication device 108 uses its private key to decrypt transmissions from the first communication device 104. Similarly, first communication device 104 uses its private key to decrypt transmissions from the second communication device 108.

To determine the trust level of a call 514, the authentication object 118 may also include an indication of trustworthiness of the authentication of the first communication device 104 based on a comparison of the data of the authentication object 118 to the registration data 114. For example, the indication of trustworthiness of the authentication of the first communication device 104 may be provided as a low level of trust, a medium level of trust, or a high level of trust. For example, a low level of trust may be based on the registration data 114 correlating to a single third party source 132. The caller ID of the first communication device 104 may be the only source used by the trusted caller ID authority 112 to register the first communication device 104 and therefore provides only a low level of trust. A medium level of trust may reflect higher correlation of the registration data 112 with the third party source 132. A high level of trust may reflect complete correlation between the registration data and the data from the third party source 132.

Figure 6A:
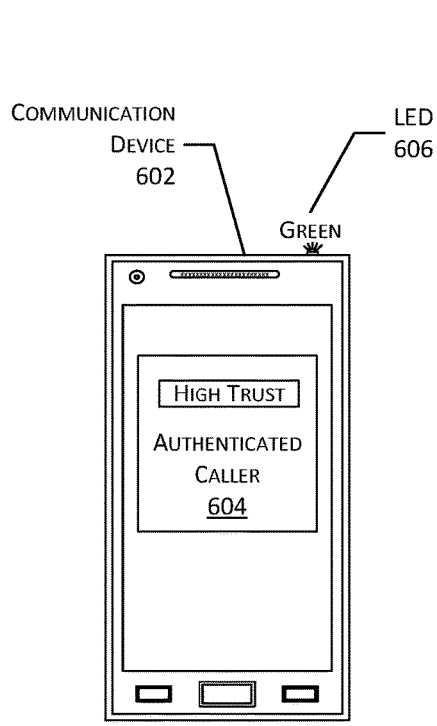
FIGS. 6a-d illustrate indications of trusted caller ID authentication status returned by a trusted caller ID authority within the scope of the present disclosure.

FIGS. 6a-d illustrate indications of trusted caller ID authentication status returned by the trusted caller ID authority 112. FIG. 6a shows a communication device 602 displaying an authenticated caller message 604 indicating that the caller ID has been authenticated. A multicolored LED 606 may be used to indicate that the caller identity has been authenticated. In FIG. 6a, the multicolored LED 606 may emit a first color of light, e.g., green light, to indicate that the caller identity has been authenticated. In some implementations information indicative of a level of trustworthiness of the authentication may be presented. For example, as depicted here the authenticated caller is indicated as having a "high trust" level that denotes the authentication used multiple sources is deemed to have a high level of trust.

Figure 6B:
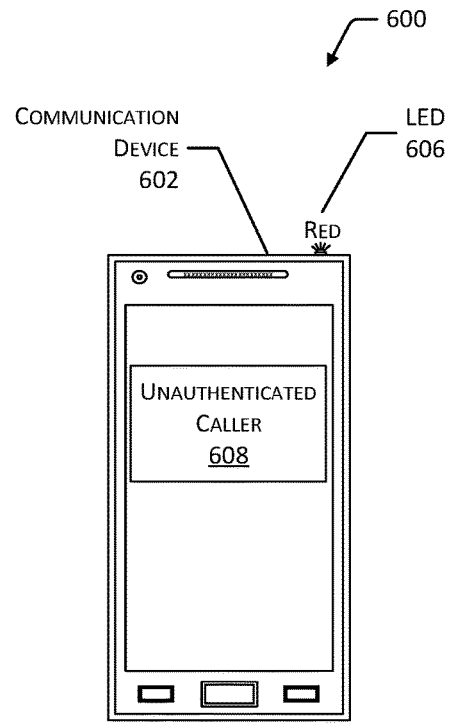

FIG. 6b shows the communication device 602 displaying an unauthenticated caller ID message 608 indicating that the caller's identity was not authenticated. The multicolored LED 606 may emit a second color of light, e.g., red light, to indicate that the caller's identity was not authenticated.

The trusted caller ID authority 112 may track failed validation attempts. The first communication device 104 may contact the trusted caller ID authority 112 to provide notification of the failed validation attempt so the first communication device 104 may rotate its private keys to prevent its authentication object 118 from being stolen. The user 102 of the first communication device may also contact the Federal Communications Commission or its service provider to provide an alert of such fraudulent use. The service provider may take additional steps to prevent the caller ID associated with the first communication device 104 from being fraudulently used by tracking further fraudulent use of the authentication object 118 of the first communication device.

The authentication object 118 may also include an indication of trustworthiness of the authentication of the first communication device 104 based on the comparison of the data of the authentication object 118 to the registration data 114. For example, the indication of trustworthiness of the authentication of the first communication device 104 may be provided as a low level of trust, a medium level of trust, or a high level of trust. For example, a low level of trust may be based on the registration data 114 correlating to a single third party source 132. The caller ID of the first communication device 104 may be the only source used by the trusted caller ID authority 112 to register the first communication device 104 and therefore provides only a low level of trust. A medium level of trust may reflect higher correlation of the registration data 112 with the third party source 132. A high level of trust may reflect complete correlation between the registration data and the data from the third party source 132.

The multicolored LED 606 may be used to indicate the trust level trustworthiness of the authentication of the first communication device 104. For example, the multicolored LED 606 may emit a first color of light, such as a red light, to indicate a low level of trust. Continuing the example, the multicolored LED 606 may emit a second color, such as a green light, to indicate a high level of trust. The multicolored LED 606 may also emit a third color of light, such as a yellow light, to indicate a medium level of trust.

Figure 6C:
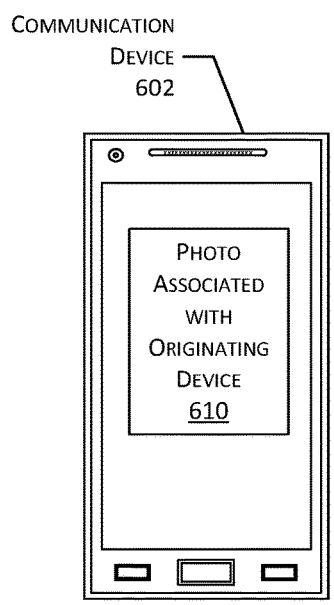

In FIG. 6c, the communication device 602 displays a photo 610 associated with the first communication device 104. The photo 610 may be displayed to indicate that the caller identity has been authenticated. The first communication device 104 may be assigned a trusted caller ID account when the first communication device 104 registers with the trusted caller ID authority 112. The caller ID account of the first communication device may be linked with an account used by a social media service associated with the user 102 of the first communication device. Alternatively, a custom photograph or avatar may be displayed on the second communication device 108. A photograph associated with a user 102 of the first communication device 104 may also be provided by the validation information 130 when validation of the first communication device 104 is successful. By linking the user's trusted caller ID account to their social media server, a photograph from the social media server may be provided to the trusted caller ID authority Trusted Caller ID Authority 112 for use as a caller ID indicator at the second communication device 108. The photograph provided to the second communication device 108 may be updated when the account of the social media service associated with the first communication device 104 is changed.

A return call may be made, at the second communication device 108, by selecting callback credentials, such as a photograph, avatar, or a pseudo identifier, without the user 106 of the second communication device 108 knowing the phone number of the first communication device 104. Such callback credentials may be controlled by the first communication device 104 and may be revoked by the first communication device 104.

Figure 6D:
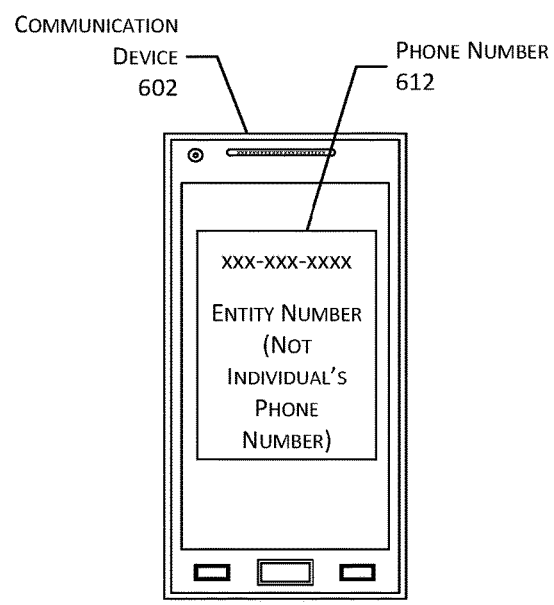

FIG. 6*d* illustrates a phone number 612 that is associated with an entity. The entity may be a business that does not want the phone number associated with individual employees to be displayed. Phone number 612 may thus be the main number of a business that is used to identify the first communication device 104. Alternatively, the phone number 612 may be from a first communication device 104 of a user 102 that has multiple communication devices and wants a specific number always displayed. When the phone number 612 is validated, the authenticated attributes associated with the caller allow differentiation and confirmation of the caller's identity among similarly named people and organizations. For example, if a name of a person is displayed on the second communication device 108, the authenticated attributes allow the recipient to verify the call is not from a similarly named person, business, or organization. When registration data 114 is provided to the trusted caller ID authority 112, a name, and payroll number of the user 102 of the first communication device 104 may be sent to the trusted caller ID authority 112.

An authentication module 116 may be used to authenticate the first communication device 104 using the registration data 114 and to authenticate the name and payroll number associated with the first communication device 104. The authentication module 116 of the trusted caller ID authority 112 may authenticate the callers of devices by comparing the name and payroll number of the user 102 of the first communication device 104 to payroll data, billing information, and so forth, to generate the authenticated attributes. The authentication module 116 identifies callers or devices associated with the first communication device 104 as trusted entities.

Illustrative Processes

Figure 7:
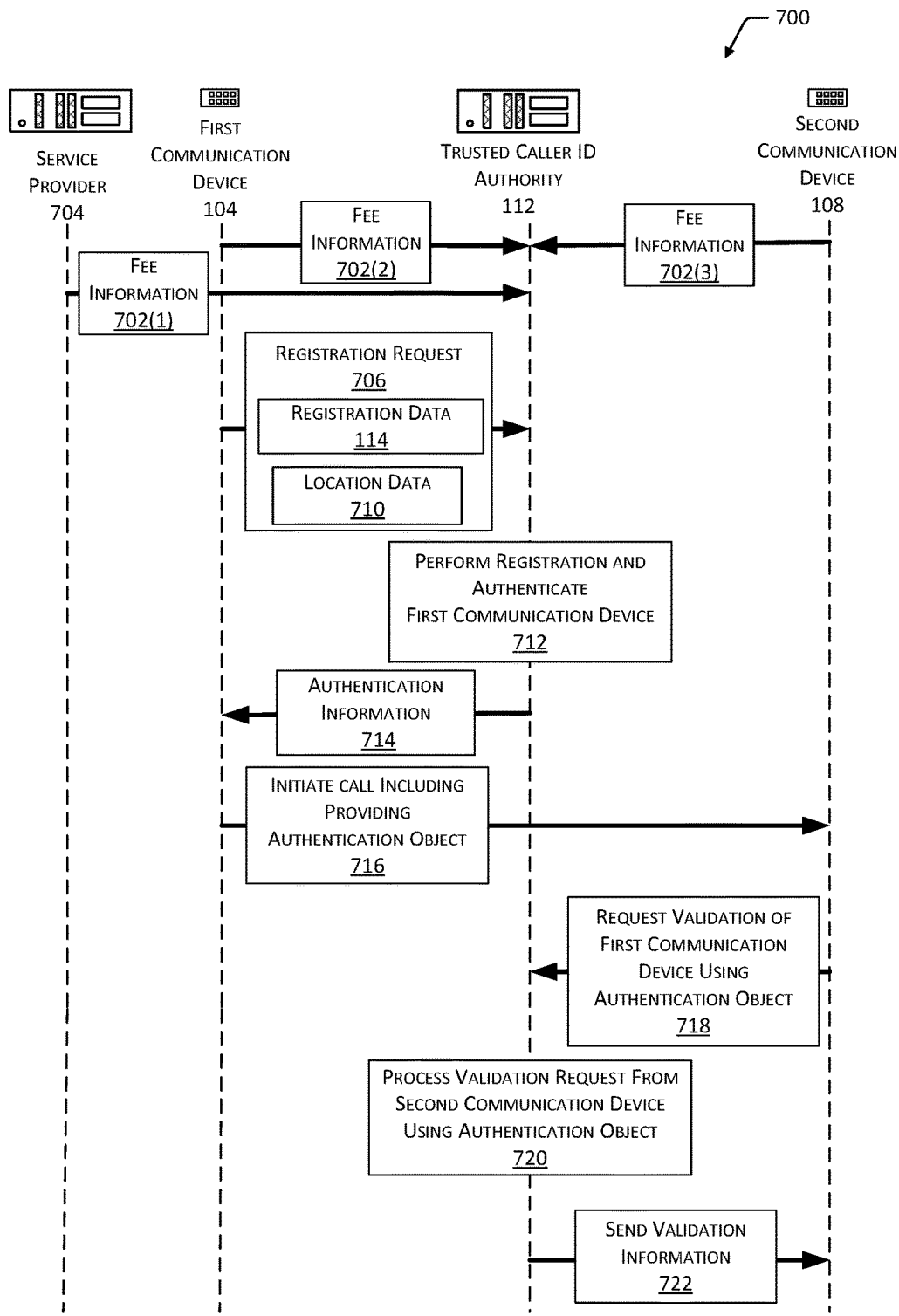
FIG. 7 is a flow diagram illustrative of a process for authenticating a caller ID of a communication device using a trusted caller ID authority.

FIG. 7 illustrates a flow diagram 700 of a process for authenticating a caller ID of a communication device using a trusted caller ID authority 112. The process may be implemented, at least in part, using the system 100 as described above.

Fee information may be used during registration of the first communication device. For example, the user of the first communication device may pay to use the trusted caller ID authority. Fee information, such as a payment account number, may be provided to the server to pay for registration of the first communication device. This fee information may be validated with a third party source, such as a payment processor, to confirm details such as name, address, and so forth.

Fee information 702(1), 702(2), and 702(3) that is associated with billing may be provided to a trusted caller ID authority 112 to enable registration of a communication device. The fee information 702(1), 702(2) and 702(3) may be provided to the trusted caller ID authority 112 by a service provider 704 to enable registration of communication devices issued by the service provider 704, by a first communication device 104, or by a second communication device 108. In some implementations, the service provider 704 may be a third party, such as a mobile network operator (MNO), also known as a wireless service provider, wireless carrier, cellular company, or mobile network carrier, that provides wireless communications services.

Fee information 702(1), 702(2), and 702(3), such as contact information, billing information, carrier of the first communication device 104, and so forth, may be included as part of the registration data 114. Fee information 702(1), 702(2), and 702(3) may be used to establish and authenticate user accounts.

As described above, businesses and telemarketers may register with the trusted caller ID authority 112 to display the companies contact information, such as the main phone number of a business, for identifying the first communication device 104. Telemarketers can contact users who have opted-in to receiving telemarketer phone calls. Telemarketers may pay a fee to register with the trusted caller ID authority 112 and securely contact potential customers. In another implementation, service providers 704 may perform the registration with the trusted caller ID authority 112 for a fee to use the caller ID information to register communication devices that the service providers 704 issues to their customers.

A first communication device 104 sends a registration request 706, which may include registration data 114 to the trusted caller ID authority 112. The first communication device 104 may also send location data 710 to the trusted caller ID authority 112 as part of the registration data 114. The trusted caller ID authority 112 registers and authenticates 712 the first communication device 104. When the first communication device 104 is authenticated, the first communication device 104 receives an authentication object 714 from the trusted caller ID authority 112.

The first communication device 104 initiates a call 716 to second communication device 108 and provides the second communication device 108 an authentication object 118 associated with first communication device 104. The second communication device 108 sends a request for validation 718 of the first communication device 104 to trusted caller ID authority 112 using the authentication object 118 of first communication device 104. The trusted caller ID authority 112 processes the validation request 720 using the authentication object 118 and determines the registration and authentication status of the first communication device 108. The trusted caller ID authority 112 sends 722 validation information to the second communication device 108. The validation information 130 may include the registration and authentication status of the first communication device 104.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs may be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a network interface;
   at least one memory storing computer-executable instructions; and
   at least one hardware processor configured to access the at least one memory and execute the computer-executable instructions to:
   receive, using the network interface, a request from a first communication device comprising registration data, the registration data including:
   a public key,
   a telephone number,
   carrier data indicative of a telecommunication carrier used by the first communication device,
   a hardware identifier, and
   location data indicative of a location of the first communication device;
   access identification data associated with the first communication device from a third party source;
   determine at least a portion of the registration data is associated with the first communication device based on a comparison of the registration data to the identification data accessed from the third party source;
   generate an authentication object associated with the first communication device, the authentication object including encrypted data, wherein the encrypted data is cryptographically verifiable data following decryption and further wherein the encrypted data is indicative of trustworthiness of the authentication of the first communication device based on the comparison of the registration data to the identification data from the third party source;
   send the authentication object including the encrypted data to the first communication device;
   receive, from a second communication device, a request for validation of the first communication device including the authentication object, the authentication object including the encrypted data, wherein the request is responsive to initiation of a telephone call from the first communication device to the second communication device;
   decrypt the encrypted data of the authentication object to produce decrypted data;
   validate the first communication device using the decrypted data received in the authentication object; and
   send validation information to the second communication device.

2. The system of claim 1, further comprising computer-executable instructions to:
   authenticate the first communication device using the authentication object, the authentication object including a caller authentication token having data associated with the first communication device and a token secret, the first communication device identified by the token secret.

3. The system of claim 1, further comprising computer-executable instructions to:
   receive the authentication object from the second communication device using a short message service (SMS); and
   wherein the validation information is sent to the second communication device using the SMS.

4. The system of claim 1, the registration data further including an identification of an organization associated with the first communication device and biometric data obtained from a user of the first communication device; and
   further comprising computer-executable instructions to:
   process the biometric information to determine an identity of the user of the first communication device; and
   wherein the authentication object is based on the identity.

5. A system comprising:
   a network interface;
   at least one memory storing computer-executable instructions; and
   at least one hardware processor configured to access the at least one memory and execute the computer-executable instructions to:
   send, using the network interface, an authentication object to a first communication device, wherein the authentication object was generated responsive to authentication of the first communication device based on identification data associated with the first communication device accessed from a third party source matching registration data received from the first communication device, the authentication object including encrypted data that is cryptographically verifiable following decryption and is indicative of trustworthiness of the authentication of the first communication device;
   receive the authentication object from a second communication device contemporaneously with initiation of a telephone call from the first communication device to the second communication device;
decrypt the encrypted data of the authentication object to produce decrypted data;
validate the first communication device using the decrypted data received in the authentication object; and
send validation information to the second communication device.

6. The system of claim 5, the computer-executable instructions to receive the registration data from the first communication device, including one or more of:
a public key;
a telephone number;
carrier data indicative of a telecommunication carrier used by the first communication device;
a hardware identifier; or
location data indicative of location the first communication device.

7. The system of claim 5, the computer-executable instructions to authenticate the first communication device using the registration data further comprising computer-executable instructions to:
access the third party source to authenticate the registration data associated with the first communication device;
determine at least a portion of the registration data is associated with the first communication device based on a comparison of the registration data with data from the third party source; and
include with the authentication object an indication of trustworthiness of the authentication of the first communication device based on the comparison of the registration data to the data from the third party source.

8. The system of claim 5, the computer-executable instructions to validate the first communication device using the authentication object further comprising computer-executable instructions to:
process the authentication object received from the second communication device to validate the first communication device by comparing data of the authentication object to the registration data provided by the first communication device; and
send to the second communication device a short message service (SMS) message prior to a call setup to provide authentication status and validation status of the first communication device.

9. The system of claim 5, the computer-executable instructions to send the validation information further comprising computer-executable instructions to:
include audio associated with a user of the first communication device with the validation information provided to the second communication device to play at the second communication device to identify the user of the first communication device.

10. The system of claim 5, the computer-executable instructions to generate the authentication object further comprising computer-executable instructions to:
associate a main phone number of a business provided in the registration data with a phone number of the first communication device; and
include, in the authentication object, the main phone number for caller identification for identifying the first communication device.

11. The system of claim 5, the computer-executable instruction to generate the authentication object further comprising computer-executable instructions to:
associate a first phone number assigned to the first communication device for use with a cross-platform mobile messaging application with a second phone number assigned by a telecommunication carrier to the first communication device; and
include, in the authentication object, the first phone number instead of the second phone number.

12. The system of claim 5, further comprising computer-executable instructions to:
receive biometric data in the registration data received from the first communication device;
send, to the first communication device, the biometric data in the authentication object;
receive, from the second communication device, the authentication object including the biometric data contemporaneously with initiation of the telephone call from the first communication device to the second communication device;
compare the biometric data in the authentication object received from the second communication device to the biometric data of the registration data to validate a user of the first communication device; and
include validation of the user of the first communication device in the validation data sent to the second communication device in response to the biometric data in the authentication object matching the biometric data of the registration data.

13. The system of claim 5, the computer-executable instructions to receive the authentication object from the second communication device further comprising computer-executable instructions to:
receive the authentication object from the second communication device through a caller identification device disposed between a network and the second communication device.

14. A communication device comprising:
a network interface;
at least one memory storing computer-executable instructions; and
at least one hardware processor configured to access the at least one memory and execute the computer-executable instructions to:
receive, from a first communication device over the network interface contemporaneously with initiation of a telephone call from the first communication device, an authentication object for validating an identity of the first communication device, the authentication object including encrypted data that is cryptographically verifiable following decryption and is indicative of trustworthiness of the authentication of the first communication device;
send a validation request, including the authentication object, to a server to validate the first communication device using the received authentication object based on comparison of registration data for the first communication device and identification data accessed from a third party source;
receive, from the server, validation information associated with the first communication device based on the encrypted data of the authentication object, the validation information including validation status of the first communication device; and
indicate validation of the first communication device when a validation status indicates successful validation of the first communication device.

15. The communication device of claim 14, the computer-executable instructions to send the validation request, including the authentication object, to the server to validate the first communication device using the received authentication object further comprising computer-executable instructions to:

send the authentication object including one or more of a caller ID certificate or a token received from the first communication device.

16. The communication device of claim 14, the computer-executable instructions to send the validation request, including the authentication object, to the server to validate the first communication device further comprising computer-executable instructions to:

execute a trusted caller identification application for providing trusted caller identification, the trusted caller identification application automatically generating the request to validate the first communication device using the authentication object.

17. The communication device of claim 14, the computer-executable instructions to receive the validation information associated with the first communication device further comprising computer-executable instructions to:

include with the validation information provided to the second communication device, audio associated with a user of the first communication device provided with the registration data for play at the second communication device to identify the user of the first communication device.

18. The communication device of claim 14, the computer-executable instructions indicating validation of the first communication device further comprising computer-executable instructions to:

indicate successful validation of the first communication device by emitting a first color of light by a multicolor light at the second communication device; or display a photograph associated with the first communication device provided by the validation information; and the computer-executable instructions indicating failed validation of the first communication device further comprising computer-executable instructions to:

indicate unsuccessful validation of the first communication device by emitting a second color of light by a multicolor light at the second communication device.

19. The communication device of claim 14, the computer-executable instructions indicating validation of the first communication device further comprising computer-executable instructions to:

display information from a social media account linked to the first communication device.

20. The communication device of claim 14, the at least one hardware processor further configured to execute the computer-executable instructions to:

display on the second communication device a pseudo identifier associated with the first communication device;

detect selection of the pseudo identifier displayed by the second communication device; and provide, in response to the selection of the pseudo identifier, callback to the first communication device without knowledge of a phone number of the first communication device.

* * * * *